_United States Patent Office_

2,803,597
Patented Aug. 20, 1957

2,803,597

PROCESS FOR PRODUCING ORGANIC PHOSPHINES

Alan R. Stiles, Berkeley, Frederick F. Rust, Oakland, and William E. Vaughan, Berkeley, Calif., assignors to Shell Development Company, San Francisco, Calif., a corporation of Delaware No Drawing. Application April 30, 1949,
Serial No. 90,778

9 Claims. (Cl. 204—158)

This invention relates to the production of organic derivatives of phosphine. More particularly, the invention provides a process for the production of organic phosphines by addition reaction between compounds of trivalent phosphorus containing hydrogen directly linked to trivalent phosphorus and an organic compound containing one or more groups of aliphatic carbon-to-carbon multiple bonds.

Heretofore the production of organic phosphines (which have proven to be particularly valuable compounds for a wide variety of applications) has required a coupling reaction between a compound containing halogen and one containing an alkali metal. For example, phosphines have been produced by heating a phosphonium iodide, zinc oxide and an alkyl iodide in a sealed tube; by contacting a phosphorus trihalide with an alkyl magnesium halide; and by contacting the sodium salt of a hydrocarbon substituted phosphine with a hydrocarbon halide in liquid ammonia. However, there are various disadvantages inherent in these coupling reactions. The first is characterized by poor yields, the second is too expensive for large scale production and special apparatus is required to employ the very low temperatures required by the third.

We have now discovered that compounds of trivalent phosphorus having hydrogen directly linked to trivalent phosphorus, when brought into contact with compounds containing aliphatic carbon-to-carbon multiple bonds in the presence of free radicals, add to the multiply bound carbon atoms thereof to form organic phosphines. The reaction is general and can be utilized to replace one or all of the hydrogen atoms of phosphine with organic radicals which may be hydrocarbon radicals, or organic radicals containing metallic or non-metallic atoms in addition to carbon atoms.

Broadly stated, the present process thus comprises additively reacting, in the presence of free radicals, a compound of trivalent phosphorus having at least one atom of hydrogen directly bonded to a trivalent atom of phosphorus with an organic compound containing at least one group of aliphatic carbon-to-carbon multiple bonds to form a compound in which at least one bond of a group of aliphatic multiple bonds linking a pair of carbon atoms has been replaced by single bonds from the carbon atoms to, respectively, a hydrogen atom and a phosphorus atom.

As mentioned previously, the reaction process is general in nature and a wide variety of compounds of trivalent phosphorus having hydrogen directly bonded to an atom of trivalent phosphorus react in accordance with the process of the invention to form the corresponding organic phosphines. For example, phosphine halides of the formula

where X represents a halogen atom and Y represents a halogen atom, a hydrogen atom, or an organic radical a carbon atom of which is attached to the P—H group (such as monomethylchlorophosphine) react with the defined class of organic compounds to form organic phosphine halides; and phosphine salts of the formula

where M represents a metal atom and R represents a hydrogen atom, a halogen atom, or an organic radical a carbon atom of which is attached to the P—H group (such as sodium hydrogen phosphide or sodium methylphosphine) react with the defined class of organic compounds to form organic phosphine salts.

Phosphines containing P—H groups are a preferred class of reactants for employment in the process of the invention. The term "phosphine" is employed in its generic sense in accordance with the I. U. C. Rule 34, thus, "a phosphine containing a P—H group" refers to a compound of the general formula

where R represents a hydrogen atom or an organic radical which is bonded to the phosphorus atom by a carbon-to-phosphorus bond.

Illustrative examples of phosphines which react, when employed in the process of the invention, to form organic phosphines include phosphine, ethylphosphine, methylpropylphosphine, dibutylphosphine, cyclohexylphosphine, 3-chloropropylphosphine, bis(2-methyl-3-aminopropyl)phosphine, dodecylphosphine, phenylphosphine, butyl tolylphosphine, bis(2-phenylethyl)phosphine, 3-butenylphosphine, bis(3-hydroxypropyl)phosphine, 3-allyloxypropylphosphine, 3 - amylmercaptopropylphosphine, bis(3 - methylaminopropyl)phosphine, 3 - carbomethoxypropylphosphine, eicosylphosphine and 3-acetylpropylphosphine.

The employment of "saturated phosphines containing a P—H group," i. e. compounds of the formula

where R represents a hydrogen atom or a saturated hydrocarbon radical, is particularly preferred.

Unsaturated hydrocarbon phosphines, when they contain groups of aliphatic carbon-to-carbon multiple bonds as well as a P—H group, react in the present process both as the phosphine reactant and as the unsaturated reactant. Their employment results in the formation of compounds containing a plurality of phosphino groups and/or the conversion of an unsaturated phosphine to a polyphosphino compound. For example, allylmethylphosphine reacts with 1-butene in accordance with the process to form mixed products including methylbutyl-3-(allylmethylphosphino)propylphosphine, $CH_2=CHCH_2P(CH_3)CH_2CH_2CH_2P(CH_3)C_4H_9$ and allylphosphine alone reacts in accordance with the process to form mixed products including allyl-3-phosphinopropylphosphine, $CH_2=CHCH_2PHCH_2CH_2CH_2PH_2$ and, in both cases, higher polymers.

Any compound containing at least one group of aliphatic carbon-to-carbon multiple bonds reacts, when employed in the process of the invention, to form organic phosphines. The term "aliphatic" is employed in its ordinary sense as a modifier of the term "carbon-to-carbon multiple bonds" and the phrase refers to multiple bonds between carbon atoms which are not members of a ring of carbon atoms joined by coordinate multiple bonds and exhibiting the peculiar type of unsaturation known as aromatic unsaturation.

Illustrative examples of unsaturated compounds which react, when employed in the process of the invention, to form organic phosphines, include, ethylene, 2-butene, isobutene, cyclohexene, allyl alcohol, allylamine, allyl chloride, 3-sulfolene, methyl acrylate, methyl vinyl ether, diallyl phthalate, styrene, butadiene, methallyl alcohol, methallyl mercaptan, methacrylonitrile, diallyl sulfide, diallyl ether, dimethallylamine, vinyl acetate, 3-butenylphosphine, methylpentadiene, dimethyl 2-propenephosphonate, isocrotyl chloride, trimethallyl phosphite, acrolein diacetate, 1-eicosene, and methyl vinyl ketone.

A preferred class of unsaturated compounds for employment in the present process consists of the monoolefinic compounds in which the olefinic group constitutes the only unsaturated group in the molecule. The alkenes are a particularly preferred class of reactants.

In accordance with the present invention organic phosphines are produced by reacting organic compounds containing at least one aliphatic carbon-to-carbon multiple bond with phosphines having at least one hydrogen atom directly linked to the trivalent atom of phosphorus in the presence of free radicals which initiate or promote the desired reaction. The reaction occurs substantially independent of temperature and can be conducted at any temperature at which the phosphine, the unsaturated compound and the phosphines produced by their reaction are stable.

It has been discovered in accordance with the invention that various methods can be employed to generate the necessary free radicals in the reaction mixture and that a wide variety of materials can be used as the source of the free radicals. According to one aspect of the invention the desired reaction can be effected by subjecting a mixture (gaseous or liquid) of a phosphine having hydrogen directly bonded to the trivalent phosphorus atom and the aliphatically unsaturated reactant to irradiation with actinic light, e. g., to light radiations that are absorbed by the phosphine and lead to dissociation thereof to produce free radicals. According to another aspect of the invention, the desired reaction is carried out in the presence of an added photochemically dissociable compound, such as acetone, while subjecting the reaction mixture to irradiations that lead to dissociation of the added photochemically dissociable compound or of both said compound and the phosphine reactant. In either of the above cases any temperature at which the reactants and their products are stable, including temperatures well below normal room temperature, can suitably be used. According to a still further embodiment of the invention, the reactants can be mixed with a compound (a peroxide, for example) which is thermochemically decomposed to form free radicals at a temperature below the thermal decomposition temperature of the reactants or their products and the desired reaction effected by heating the mixture to about the decomposition temperature of said compound.

A preferred method of conducting the process of the invention comprises mixing the reactants with a compound which is photochemically or thermochemically decomposed to form free radicals under conditions at which the phosphine, the unsaturated compound and their addition products are stable, and photochemically or thermochemically decomposing said compound to form the necessary free radicals which serve to initiate or promote the desired reaction. Illustrative examples of compounds which can be used in this manner include organic peroxides, tetraethyl lead, diazo compounds, the "positive halogen compounds" (described by Robertson and Watson, J. Chem. Soc., April 1947, page 492, as including such compounds as N,2,4-trichlorobenzanilide, ethyl $\alpha$-bromomalonate and the like), or still other compounds which are thermally decomposed at a controllable rate into free radicals at a temperature below the decomposition temperature of the reactants.

The organic peroxides form a particularly convenient source of free radicals as they are activated by a wide range of elevated temperatures, and their employment allows a close control of the reaction and does not require specialized apparatus.

U. S. Patent No. 2,379,218 describes numerous suitable organic peroxides and the recommended temperature ranges for their use, including,

| | |
|---|---|
| Diethyl percarbonate | 45 to 70 |
| Allyl percarbonate | 50 to 80 |
| Benzoyl peroxide | 70 to 80 |
| Acetyl peroxide | 70 to 90 |
| $\beta$-Chlorobenzoyl peroxide | 85 to 95 |
| Methyl n-amyl ketone peroxide | 110 to 135 |
| Methyl isobutyl ketone peroxide | 110 to 135 |
| Methyl n-propyl ketone peroxide | 115 to 140 |
| Methyl ethyl ketone peroxide | 150 to 140 |
| Acetone peroxide | 125 to 150 |
| Ethyl peroxide | 125 to 145 |
| Methyl isobutyl peroxide | 130 to 150 |
| Dicyclohexyl peroxide | 150 |

Of the organic peroxides, the tertiary-alkyl peroxides such as di-tertiary-butyl peroxide (dissociating in an effective temperature range of 110° C. to 150° C.) are especially suitable by virtue of their unusual stability during handling.

The amount of added material employed to form the source of the free radicals can be varied over wide limits depending in each case upon the reactivity of the material and reactants employed. In general, amounts of from about 1 to about 10 mole percent based upon the total moles of reactants (the unsaturated compound and the phosphine) are sufficient. However, where relatively unreactive reactants are employed, or where substantial amounts of solvents or diluents are used, substantially larger amounts of the materials forming the source of free radicals can be employed.

The process of the invention can be conducted by maintaining the reactants in the liquid or vapor phase and can be conducted as a batch or continuous process.

The process can be conducted by dissolving the reactants and, if one is employed, the added compound to be decomposed into free radicals, in an inert solvent. Illustrative examples of suitable solvents include normally liquid hydrocarbons such as pentane, octane, benzene and toluene; saturated esters such as butyl, isopropyl or amyl acetate; saturated ethers such as methyl 2-hydroxyethyl ether, dioxane and anisol.

Since solvents can suitably be used and the process is not dependent upon physical properties such as the boiling or melting point of the reactant; the phosphines, unsaturated compounds or free radical forming compounds can be of substantially any molecular weight, thus can contain carbon atom chains of substantially any number of carbon atoms. However, in view of the comparative cost and availability of high molecular weight compounds as compared to those of a lower molecular weight, the employment of phosphines, unsaturated compounds and free radical forming compounds of not more than about 20 carbon atoms are preferred.

The phosphine and the unsaturated compound can be employed in substantially any proportions. When hydrogen phosphide is used the products are mixtures of compounds in which one, two or three hydrogen atoms have been replaced. However, by employing the appropriate excesses of either the unsaturated compound or the phosphine, the process can be adapted to producing any one of the products in predominant amounts. When a disubstituted phosphine is used with a monoolefin, the process produces trisubstituted organic phosphines in the substantial absence of side reaction products.

When the phosphine and the unsaturated compound employed are capable of forming more than one type of organic phosphine, i. e., primary, secondary or tertiary phosphines, the individual products, in general, can be readily isolated by a fractional distillation of the reaction mixture, or, if desired, they can be isolated by selective extraction with acids of the appropriate strength since the primary phosphines have been found to be stronger bases than phosphine, and the secondary and tertiary phosphines have been found to be stronger bases than the primary phosphines.

The following examples are presented to illustrate in detail various operational procedures which result in the production of organic phosphines in accordance with the process of the invention. As many variations in the reactants and methods of conducting the reaction are within the scope of the invention, the invention is not to be construed as being limited to the specific compounds or conditions set forth in the examples.

(A) *Initiating the reaction by thermochemically forming free radicals in situ*

EXAMPLE I

Organic phosphines are produced in accordance with the process of the invention by heating a liquid mixture of 0.05 mole of phosphine, 0.15 mole of 1-butene and 2.5 mole percent (0.005 mole) of di-tertiarybutyl peroxide to a temperature of 122° C. The phosphines can be isolated by a fractional distillation of the reaction products at a reduced pressure.

That reacting a derivative of trivalent phosphorus containing a P—H group with an olefinic compound in the presence of the free radicals formed by a thermally decomposable compound at its decomposition temperature results in the production of an organic phosphine by the replacement of one of the multiple bonds linking a pair of carbon atoms of 1-butene by single bonds from the carbon atom to, respectively, a hydrogen atom and a phosphorus atom was established by isolating from the reaction products formed by heating the above reactants as indicated for 16 hours, tributylphosphine B. P. 144–146° C./54 mm. (literature 149.5/50 mm.), which formed a carbon disulfide addition product having a melting point of 65–66° C. (literature 65.5° C.).

EXAMPLE II

Organic phosphines are produced in accordance with the process of the invention by heating a mixture of 0.02 mole of phosphine, 0.06 mole of 1-octene and 5 mole percent of di-tertiarybutyl peroxide to a temperature of 119° C. The phosphine can be isolated by a fractional distillation of the reaction products.

That the process of the invention is adapted to the production of high molecular weight solid organic phosphines was established by isolating from the reaction products formed by heating the above reactants as indicated for 18 hours, a white crystalline solid which was identified as trioctylphosphine by the following analysis:

|  | Found | Calculated for $(C_8H_{17})_3P$ |
|---|---|---|
| Percent Phosphorus | 7.60, 7.61 | 8.44 |
| Molecular Weight | 367 | 367 |

EXAMPLE III

Organic phosphines are produced in accordance with the process of the invention by heating a mixture of 0.05 mole of phosphine, 0.15 mole of 2-butene and 5 mole percent di-tertiarybutyl peroxide to a temperature of 122° C. The phosphine can be isolated by a fractional distillation of the reaction products.

That the process of the invention is adapted to the production of organic phosphines in which secondary carbon atoms are attached to the phosphorus atom and to the employment of olefinic compounds containing an internal double bond was established by isolating from the reaction products formed by heating the above reactants as indicated for 18 hours, a liquid B. P. 66–77° C. which was identified as (2-butyl)phosphine by the following analysis:

|  | Found | Calculated for $(sec\text{-}C_4H_9)PH_2$ |
|---|---|---|
| Percent C | 54.7 | 53.3 |
| Percent H | 16.9 | 12.2 |
| Percent P | 21.1 | 34.4 | and a liquid B. P. 162–165° C. which was identified as di(2-butyl)phosphine by the following analysis:

|  | Found | Calculated for $(sec\text{-}C_4H_9)_2PH$ |
|---|---|---|
| Percent C | 61.8 | 65.8 |
| Percent H | 12.2 | 13.0 |
| Percent P | 19.6 | 21.2 |

(B) *Initiating the reaction by photochemically forming free radicals in situ*

EXAMPLE IV

Organic phosphines are produced in accordance with the process of the invention by irradiating with ultraviolet light a mixture of 0.155 mole of 1-butene and 0.155 mole of phosphine contained in a clear quartz vessel. The phosphines can be isolated by a fractional distillation of the reaction products.

That reacting a derivative of trivalent phosphorous containing a P—H group with an olefinic compound in the presence of the free radicals formed by a photochemically decomposable compound results in the same reaction that occurs in the presence of the free radicals formed by a thermochemically decomposable compound was established by isolating from the reaction products formed by irradiating the above reactants as indicated for 150 minutes at 20° C., mono, di and tributylphosphine (identified by comparing the physical properties with those reported for the same compounds and by the analysis reported below). As the secondary phosphine could only be formed by a reaction of the primary phosphine with another molecule of the olefin and the tertiary phosphine by the similar reaction of the secondary phosphine, the reaction further established the appicability of the process of the invention for the addition to olefinic bonds of derivatives of trivalent phosphorus containing a P—H group in which one or both the remaining valences of phosphorus are satisfied by organic radicals.

Butylphosphine was isolated as a liquid B. P. 86.2–87.8° C., $n_D^{20}$ 1.4477.

|  | Found | Calculated for $C_4H_9PH_2$ |
|---|---|---|
| Percent C | 55.3 | 53.4 |
| Percent H | 12.2 | 12.2 |
| Percent P | 30.(7), 31.(2) | 34.4 |
| M. W. (cryo-benzene) | 112 | 90.0 |

Dibutylphosphine was isolated as a liquid B. P. 181.0–185.0 C., $n_D^{20}$ 1.4572.

|  | Found | Calculated for $(C_4H_9)_2PH$ |
|---|---|---|
| Percent C | 65.0 | 65.8 |
| Percent H | 13.1 | 13.0 |
| Percent P | 21.3, 21.3 | 21.2 |
| M. W. (cryo-benzene) | 155 | 146.0 |

Tributylphosphine was isolated as a liquid B. P. 240.4–242.2° C., $n_D^{20}$ 1.4634.

|  | Found | Calculated for $(C_4H_9)_3P$ |
|---|---|---|
| Percent C | 62.7 | 71.3 |
| Percent H | 12.4 | 13.4 |
| Percent P | 15.4, 15.5 | 15.3 |
| M. W. (cryo-benzene) | 244 | 202.0 |

EXAMPLE V

Organic phosphines are produced in accordance with the process of the invention by irradiating with ultraviolet light a mixture of 0.062 mole of phosphine, 0.181 mole of isobutene and 2.5 mole percent of acetone contained in a clear Pyrex vessel. The phosphines can be isolated by a fractional distillation of the reaction products.

That reacting a derivative of trivalent phosphorus containing a P—H group with an olefinic compound in the presence of free radicals formed by an added photochemically decomposable compound results in the same reaction that occurs in the presence of free radicals derived from other sources (Pyrex, a heat resisting glass containing a high proportion of silica, cuts off the light having a wave length low enough to dissociate phosphine) was established by isolating from the reaction products formed by irradiating the above reactants as indicated for 150 minutes at 20° C., mono, di and triisobutylphosphine (identified by the analysis reported below). The reaction further demonstrates the applicability of the process of the invention for the addition of derivatives of trivalent phosphorus containing a P—H group to the olefinic bonds of compounds containing a branched chain.

Isobutylphosphine was isolated as a liquid B. P. 78.0–79.6° C. To facilitate the obtaining of an accurate elementary analysis the phosphine was oxidized with fuming nitric acid to isobutanephosphonic acid.

|  | Found | Calculated for $(iso-C_4H_9)P(OH)_2$ |
|---|---|---|
| Percent C | 34.7, 34.6 | 34.8 |
| Percent H | 8.0, 8.3 | 8.0 |
| Percent P | 22.5 | 22.5 |
| Equiv. Wt | 138.8 | 138.0 |

Diisobutylphosphine was isolated as a liquid B. P. 169.6–171.8° C. The phosphine was oxidized with fuming nitric acid to diisobutylphosphinic acid.

|  | Found | Calculated for $(iso-C_4H_9)_2POH$ |
|---|---|---|
| Percent C | 53.9, 53.6 | 54.0 |
| Percent H | 10.7, 10.7 | 10.7 |
| Percent P | 17.4 | 17.4 |
| Equiv. Wt | 177.0 | 178.0 |

Triisobutylphosphine was isolated as the residue boiling above 171.8° C. The phosphine was oxidized with fuming nitric acid to triisobutylphosphine oxide.

|  | Found | Calculated for $(iso-C_4H_9)_3P$ |
|---|---|---|
| Percent C | 65.1, 65.1 | 66.0 |
| Percent H | 12.3, 12.3 | 12.3 |
| Percent P | 13.2 | 13.6 |

EXAMPLE VI

Organic phosphines are produced in accordance with the process of the invention by irradiating with ultraviolet light a mixture of 0.148 mole of phosphine and 0.148 mole of cyclohexene contained in a clear quartz vessel. The phosphines can be isolated by a fractional distillation of the reaction products.

That the process of the invention is applicable to the addition of a derivative of trivalent phosphorus containing a P—H group to the olefinic bonds of cyclic olefinic compounds was established by isolating from the reaction products formed by irradiating the above reactants as indicated for 420 minutes at 20° C., mono and dicyclohexylphosphine (identified by the analysis reported below).

Cyclohexylphosphine was isolated as a liquid B. P. 146.8–149.4° C. The phosphine was oxidized by fuming nitric acid to cyclohexenephosphonic acid.

|  | Found | Calculated for $(cyclo-C_6H_{11})P(OH)_2$ |
|---|---|---|
| Percent C | 43.6, 43.8 | 43.9 |
| Percent H | 8.1, 8.0 | 7.9 |
| Percent P | 18.8, 19.3 | 18.7 |
| Equiv. Wt | 165.0 | 164.0 |

Dicyclohexylphosphine was isolated as a residue boiling above 149.4° C. The phosphine was oxidized by fuming nitric acid to dicyclohexylphosphinic acid.

|  | Found | Calculated for $(cyclo-C_6H_{11})_2POH$ |
|---|---|---|
| Percent C | 61.9, 62.1 | 62.6 |
| Percent H | 10.2, 9.9 | 10.0 |
| Percent P | 12.6 | 13.5 |
| Equiv. Wt | 233.0 | 230.0 |

(C) *Producing polyfunctional organic phosphines*

EXAMPLE VII

Organic phosphines containing hydroxyl groups are produced in accordance with the process of the invention by irradiating with ultraviolet light a mixture of 0.32 mole of phosphine and 0.33 mole of allyl alcohol contained in a clear quartz vessel. The phosphines can be isolated by a fractional distillation of the reaction products.

EXAMPLE VIII

Organic phosphines containing amino groups are produced in accordance with the process of the present invention by irradiating with ultraviolet light a mixture of 0.082 mole of phosphine and 0.16 mole of allylamine contained in a clear quartz vessel. The phosphines can be isolated by a fractional distillation of the reaction products.

EXAMPLE IX

Organic phosphines containing halogen atoms are produced in accordance with the process of the present invention by irradiating with ultraviolet light a mixture of 0.09 mole of phosphine and 0.18 mole of allyl chloride contained in a clear quartz vessel. The phosphines can be isolated by a fractional distillation of the reaction products.

EXAMPLE X

Organic phosphines containing thioether groups are produced in accordance with the process of the present invention by irradiating with ultraviolet light a mixture of 0.08 mole of phosphine and 0.16 mole of methyl vinyl sulfide contained in a clear quartz vessel. The phosphines can be isolated by a fractional distillation of the reaction products.

EXAMPLE XI

Organic phosphines containing aromatic groups are produced in accordance with the process of the present invention by irradiating with ultraviolet light a mixture of 0.12 mole of phosphine and 0.12 mole of styrene contained in a clear quartz vessel. The phosphines can be isolated by a fractional distillation of the reaction products.

EXAMPLE XII

Organic phosphines containing phosphono groups are produced in accordance with the process of the present invention by irradiating with ultraviolet light a mixture of 0.2 mole of phosphine and 0.2 mole of dibutyl 2-propenephosphonate contained in a clear quartz vessel. The phosphines can be isolated by a fractional distillation of the reaction products.

EXAMPLE XIII

Organic phosphines containing carbonyl groups are produced in accordance with the process of the present invention by irradiating with ultraviolet light a mixture of 0.2 mole of phosphine and 0.2 mole of methyl vinyl ketone contained in a clear quartz vessel. The phosphines can be isolated by a fractional distillation of the reaction products.

EXAMPLE XIV

Organic phosphines containing carboxyl groups are produced in accordance with the process of the present invention by irradiating with ultraviolet light a mixture of 0.07 mole of phosphine and 0.14 mole of methyl acrylate contained in a clear quartz vessel. One containing the carboxyl group in the form of an esterifying acryl group is produced by irradiating with ultraviolet light a mixture of 0.14 mole of phosphine and 0.14 mole of allyl acetate contained in a clear quartz vessel. The phosphines can be isolated by a fractional distillation of the reaction products.

EXAMPLE XV

Organic phosphines containing oxyether groups are produced in accordance with the process of the present invention by irradiating with ultraviolet light a mixture of 0.073 mole of phosphine and 0.21 mole of methyl vinyl ether contained in a clear quartz vessel. The phosphines can be isolated by a fractional distillation of the reaction products.

That the process of the invention is applicable to the addition of a derivative of trivalent phosphorus containing a P—H group to the olefinic bonds of compounds containing functional groups in addition to the olefinic bonds was established by isolating and identifying numerous polyfunctional organic phosphines produced in accordance with the process. The following are typical of the products identified.

(a) Mono, bis and tris(3-hydroxypropyl)phosphines were isolated from the reaction products obtained by irradiating the reactants described in Example VII above as indicated for 60 minutes at 20° C.

3-hydroxypropylphosphine was isolated as a liquid B. P. 85.2° C./32.0 mm. The phosphine was oxidized by the action of fuming nitric acid to a 2-carboxyethanephosphonic acid,

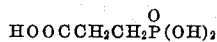
$$HOOCCH_2CH_2P(OH)_2$$

|  | Found | Calculated for $C_3H_7O_5P$ |
| --- | --- | --- |
| Percent C | 22.1, 22.2 | 23.4 |
| Percent H | 4.6, 4.7 | 4.6 |
| Percent P | 22.5, 22.1 | 20.1 |
| Equiv. Wt | 153 | 154 |

A second sample of the phosphine was oxidized by the action of hydrogen peroxide to 3-hydroxypropanephosphonic acid,

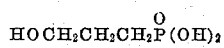
$$HOCH_2CH_2CH_2P(OH)_2$$

|  | Found | Calculated for $C_3H_9O_4P$ |
| --- | --- | --- |
| Percent C | 25.4, 25.1 | 25.7 |
| Percent H | 5.9, 5.8 | 6.4 |
| Percent P | 24.5, 24.5 | 22.1 |
| Equiv. Wt | 146 | 140 |

Bis(3-hydroxypropyl)phosphine was isolated as a liquid B. P. 123–130° C./1 mm.

|  | Found | Calculated for $(HOC_3H_6)_2PH$ |
| --- | --- | --- |
| Percent C | 47.1, 47.2 | 48.0 |
| Percent H | 10.1, 10.0 | 10.0 |

Tris(3-hydroxypropyl)phosphine was isolated as a liquid B. P. 196–198° C./1 mm.

|  | Found | Calculated for $(HOC_3H_6)_3P$ |
| --- | --- | --- |
| Percent C | 51.3, 51.8 | 51.9 |
| Percent H | 10.3, 10.6 | 10.1 |

(b) Mono, bis and tris(3-aminopropyl)phosphines were isolated from the reaction products obtained by irradiating the reactants described in Example VIII above as indicated for 5 hours at 20° C.

3-aminopropylphosphine was isolated as a liquid B. P. 58.5–62.0° C./52 mm.

|  | Found | Calculated for $NH_2C_3H_6PH_2$ |
| --- | --- | --- |
| Percent C | 38.1, 37.6 | 39.6 |
| Percent H | 10.8, 10.4 | 11.0 |
| Percent P | 32.(6), 32.(4) | 34.1 |
| Percent N | 14.5 | 15.4 |

Bis(3-aminopropyl)phosphine was isolated as a liquid B. P. 162–168° C./36 mm.

|  | Found | Calculated for $(NH_2C_3H_6)_2PH$ |
| --- | --- | --- |
| Percent C | 46.3, 46.5 | 48.7 |
| Percent H | 11.1, 11.2 | 11.5 |
| Percent P | 20.(7), 20.(2) | 20.9 |
| Percent N | 17.3, 14.4 | 18.9 |

Tris(3-aminopropyl)phosphine was isolated as a residue boiling above 168° C./36 mm.

|  | Found | Calculated for $(NH_2C_3H_6)_3P$ |
| --- | --- | --- |
| Percent C | 52.1, 52.5 | 52.6 |
| Percent H | 11.8, 12.0 | 11.7 |
| Percent P | 15.2, 15.5 | 15.1 |
| Percent N | 20.2, 20.3 | 20.5 |

(c) 3-chloropropylphosphine was isolated from the reaction products obtained by irradiating the reactants described in Example IX above as indicated for 6 hours at 20° C. The phosphine boiled at 125° C. It was oxidized by the action of fuming nitric acid to 3-chloropropanephosphonic acid,

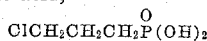
$$ClCH_2CH_2CH_2P(OH)_2$$

|  | Found | Calculated for $C_3H_8O_3PCl$ |
| --- | --- | --- |
| Percent C | 22.7, 23.0 | 22.7 |
| Percent H | 5.2, 5.4 | 5.0 |
| Percent Cl | 22.3, 22.3 | 22.4 |
| Equiv. Wt | 161 | 158.5 |

(d) Mono and bis(methylcarboxyethyl)phosphines were isolated from the reaction products obtained by irradiating the reactants described in the first sentence of Example XIV above as indicated for 5 hours at 20° C.

2-methylcarboxyethylphosphine, $CH_3OOCCH_2CH_2PH_2$ was isolated as a liquid B. P. 74–75° C./56 mm. The phosphine was oxidized by the action of fuming nitric acid to 2-carboxyethanephosphonic acid,

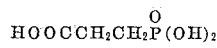

|  | Found | Calculated for $C_3H_7O_5P$ |
|---|---|---|
| Percent C | 26.3, 26.5 | 23.4 |
| Percent H | 5.0, 5.1 | 4.6 |

Bis(2-methylcarboxyethyl)phosphine $$(CH_3OOCCH_2CH_2)_2PH$$

was isolated as a liquid B. P. 95° C./6 mm.

|  | Found | Calculated for $C_8H_{15}O_4P$ |
|---|---|---|
| Percent C | 50.4, 49.5 | 46.6 |
| Percent H | 7.2, 7.0 | 7.3 |

(e) Mono, bis and tris(2-methoxyethyl)phosphines were isolated from the reaction products obtained by irradiating the reactants described in Example XV above as indicated for 6 hours at 20° C.

2-methoxyethylphosphine, $CH_3OCH_2CH_2PH_2$, was isolated as a liquid B. P. 78–85.5° C.

|  | Found | Calculated for $C_3H_9OP$ |
|---|---|---|
| Percent C | 40.4, 40.3 | 39.1 |
| Percent H | 10.0, 10.1 | 9.8 |

Bis(2-methoxyethyl)phosphine, $(CH_3OCH_2CH_2)_2PH$, was isolated as a liquid B. P. 113–125° C./51 mm.

|  | Found | Calculated for $C_6H_{15}O_2P$ |
|---|---|---|
| Percent C | 48.8, 49.1 | 48.0 |
| Percent H | 10.2, 10.2 | 10.0 |

Tris(2-methoxyethyl)phosphine, $(CH_3OCH_2CH_2)_3P$, was isolated as a liquid B. P. 162–166° C./51 mm.

|  | Found | Calculated for $C_9H_{21}O_3P$ |
|---|---|---|
| Percent C | 52.8, 53.2 | 51.9 |
| Percent H | 10.5, 10.4 | 10.1 |

We claim as our invention:

1. A process for the production of hydrocarbon phosphines, which comprises, heating a liquid mixture of phosphine, 1-butene and from 1 to 10 mole percent of di-tertiary-butyl peroxide to a temperature of from 110 to 150° C.

2. A process for the production of hydroxypropyl phosphines which comprises, irradiating a mixture of phosphine and allyl alcohol with ultraviolet light.

3. A process for the production of aminopropyl phosphines which comprises, irradiating a mixture of phosphine, allylamine, and from 1 to 10 mole percent of acetone with light having a wave length short enough to dissociate acetone into free radicals.

4. A process for the production of hydrocarbon phosphines which comprises heating a liquid mixture of phosphine, olefin hydrocarbon and from about 1 to about 10 mole percent, based upon the amount of the phosphine and olefin hydrocarbon, of an added organic peroxide at about the dissociation temperature of the peroxide.

5. A process for the production of a phosphine which comprises mixing a compound containing trivalent phosphorus wherein there is at least one atom of hydrogen directly bonded to trivalent phosphorus with a compound containing at least one group of aliphatic carbon-to-carbon multiple bonds and subjecting the mixture to the action of a free radical reaction initiator until an appreciable and substantial amount of said organic phosphine is formed.

6. A process for the production of a phosphine having a saturated organic radical directly linked to the trivalent phosphorus atom by a carbon-to-phosphorus bond, which comprises subjecting a phosphine having one of the valencies of the phosphorus atom satisfied by a hydrogen atom and each of the remaining two valencies satisfied by a member of the group consisting of the hydrogen atom and saturated hydrocarbon radicals in admixture with a mono-olefinically unsaturated compound wherein the olefinic group constitutes the only unsaturated group in the molecule to the action of a free radical reaction initiator until an appreciable amount of said product is formed.

7. A process for the preparation of a phosphine which comprises heating together a mono-olefinic unsaturated compound in which the olefinic group constitutes the only unsaturated group in the molecule and a phosphine having at least one hydrogen atom directly bound to trivalent phosphorus in the presence of an added organic peroxide at about the dissociation temperature of the peroxide.

8. In a process for the production of an alkyl phosphine the reaction of phosphine ($pH_3$) with an olefin hydrocarbon to produce said alkyl phosphine.

9. In a process for the production of an organic phosphine, the reaction of addition of phosphine ($pH_3$) to the olefinically unsaturated linkage of a compound which contains one, and only the one, olefinically unsaturated linkage to produce said organic phosphine.

References Cited in the file of this patent

UNITED STATES PATENTS

| 2,252,675 | Prutton et al. | Aug. 12, 1941 |
| 2,437,795 | Walling | Mar. 16, 1948 |
| 2,478,390 | Hanford et al. | Aug. 9, 1949 |
| 2,492,994 | Harmon et al. | Jan. 3, 1950 |